2,874,169
1-ANDROSTENE-3,11,17-TRIONE

Samuel H. Eppstein, Galesburg, and Peter D. Meister, Kalamazoo Township, Kalamazoo County, Mich., and Adolph Weintraub, Brooklyn, N. Y., assignors to The Upjohn Company, Kalamazoo, Mich., a corporation of Michigan No Drawing. Application November 19, 1956
Serial No. 622,830

3 Claims. (Cl. 260—397.3)

This invention relates to new chemical compounds, 1,5α-androstene-3,11,17-trione and 1,5β-androstene-3,11,17-trione, which compounds possess valuable anabolic and androgenic activity.

This application is a continuation-in-part of application S. N. 493,302, filed March 9, 1955, now abandoned.

The compounds of this invention have the following structural formula:

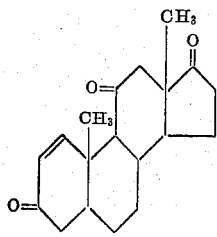

The novel compounds of this invention can be produced by the fermentative 1-dehydrogenation of allopregnane-3,11,20-trione and pregnane-3,11,20-trione, respectively, with a fungus of the genus Septomyxa, under aerobic conditions as disclosed in the copending prior application previously referred to.

As disclosed in the prior application, the operational conditions and reaction procedure and details of production can be those already known in the art of steroid bioconversion as illustrated by U. S. Patent 2,602,769, utilizing however the action of a species of fungus of the genus Septomyxa. The genus Septomyxa belongs to the class of Deuteromyces, Fungi Imperfecti, of the order Melanconiales, of the family Melaconiaceae. Among the species of the genus Septomyxa which are useful in the conversion of allopregnane-3,11,20-trione to 1,5α-androstene-3,11,17-trione and of pregnane-3,11,20-trione to 1,5β-androstene-3,11,17-trione are Septomyxa affinis (Sherb.) Wr., A. T. C. C. 6737, American Type Culture Collection, 2029 M Street, N. W., Washington 6, D. C., Septomyxa aesculi, Septomyxa corni, Septomyxa salicina, and Septomyxa tulasnei.

As disclosed in the prior application, culture of the fungi for the production of 1-dehydrogenation is in or on a medium favorable to the development of the fungi, employing conventional sources of assimilable carbon and assimilable nitrogen; and using conventional sources of mineral nutrients.

The following examples are illustrative of the production of the novel compounds, and are not to be construed as limiting.

EXAMPLE 1

Preparation of 1,5α-androstene-3,11,17-trione

One hundred liters of a medium containing the following:

Cornsteep liquor (sixty percent solids)__. 2% by weight.
Dextrose hydrate_____ 1% by weight.
Lard oil (ten percent octadecanol)_____ 80 milliliters.

was adjusted with a 25 percent sodium hydroxide solution to a pH of 4.9 and sterilized for 45 minutes at twenty pounds steam pressure in a fifty-gallon fermenter. The medium was cooled to 28 degrees centigrade and inoculated with six percent by volume of a 24-hour growth from spores of Septomyxa affinis, A. T. C. C. 6737. The medium was agitated with a sweep stirrer at 200 R. P. M. and sterile air admitted through a sparger at the rate of one liter per minute. After a period of nineteen hours, twenty grams of allopregnane-3,11,20-trione dissolved in 2000 milliliters of hot dipropylene glycol was added. The pH of the medium at this time was 4.9. Fermentation was allowed to continue for a period of 24 hours at which time the pH was 5.7. Analysis of an aliquot of the medium showed that all the substrate had been converted. A major product was identified as the compound of this invention. The beer was heated to 100 degrees centigrade for fifteen minutes, cooled, and filtered. The separated mycelium and filtrate were each extracted with methylene chloride and the extract washed with a two percent sodium bicarbonate solution. This was followed by a wash with water, and the extract was dried with sodium sulfate. The extract was concentrated to dryness, yielding a residue of 123.3 grams.

The residue was triturated with ether and then with a mixture of ether and Skellysolve B hexanes. Upon cooling, the solution yielded 12.2 grams of crude crystals, M. P. 233.5 to 242 degrees centigrade. The crude crystals were recrystallized from methanol and then from a mixture of chloroform and Sellysolve B hexanes. A final recrystallization from chloroform-ether gave 5.1 grams of pure crystals of 1,5α-androstene-3,11,17-trione, M. P. 244.5 to 246.5 degrees centigrade, $[\alpha]_D^{23} = 188$ in $CHCl_3$ (1.049 conc.)

$$\lambda_{max}^{alc.} \ 228 \ m\mu$$

$a_M$ 11,400. Infrared spectrum indicates absorption as follows: 17-ketone, 1736 cm.$^{-1}$; 11-ketone, 1701 cm.$^{-1}$; conjugated ketone, 1665 cm.$^{-1}$; $\Delta^1$-structure (C=C), 1600 cm.$^{-1}$. The ultraviolet absorption maxima at 228m$\mu$ confirms the $\Delta^1$-3-ketone system.

Analysis.—Calculated for $C_{19}H_{24}O_3$: C, 75.97; H, 8.05. Found: C, 75.20; H, 8.06.

EXAMPLE 2

1,5β-androstene-3,11,17- trione

Twelve liters of medium made as in Example 1 was sterilized in a five-gallon fermenter at twenty pounds steam pressure for sixty minutes. After cooling to 28 degrees centigrade, the medium was inoculated with five percent by volume of a 77-hour growth from spores of Septomyxa affinis, A. T. C. C. 6737. Sterile air was admitted through a sparger at the rate of one liter per minute, while the stirrer of the fermenter was adjusted to 200 R. P. M. After 24 hours for growth of the culture, 2.0 grams of pregnane-3,11,20-trione, dissolved in 120 milliliters of hot propylene glycol, was added and the fermentation continued for an additional period of 48 hours, at which time the pH of the beer was 7.2. After separation of the mycelium from the aqueous solution by filtration, extraction of each fraction was carried out in the same manner as in Example 1 and the combined methylene chloride extracts concentrated until solvent-free. The isolation followed the same procedure as in Example 1, yielding, in this case, 1,5β-androstene-3,11,17-trione. Recrystallization, following the procedure of Example 1, yielded purified product, M. P. 174.5 to 177.5 degrees centigrade. Infrared spectrum indicates absorption as follows: 17-ketone, 1740 cm.$^{-1}$; 11-ketone, 1700 cm.$^{-1}$; $\Delta^1$-3-ketone, 1674 cm.$^{-1}$; $\Delta^1$-structure (C=C), 1605 cm.$^{-1}$. The ultraviolet absorption maxima at 224 m$\mu$ confirms the $\Delta^1$-3-ketone system. The $a_M$ value was 8,500

1,5$\alpha$-androstene - 3,11,17 - trione and 1,5$\beta$-androstene-3,11,17-trione of this invention exhibit valuable anabolic and androgenic activity and can be administered in the form of tablets, capsules, syrups and the like for oral use or in suitable conventional suspension media for injection use.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound of the following structural formula:

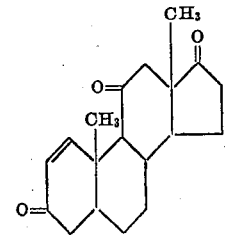

2. 1,5$\alpha$-androstene-3,11,17-trione.
3. 1,5$\beta$-androstene-3,11,17-trione.

References Cited in the file of this patent
UNITED STATES PATENTS

| | | |
|---|---|---|
| 2,441,560 | Butenandt | May 18, 1948 |
| 2,602,769 | Murray | July 8, 1953 |